United States Patent [19]

Srivastava

[11] 3,949,418
[45] Apr. 6, 1976

[54] BURST GATE AND BACKPORCH CLAMPING CIRCUITRY

[75] Inventor: Gopal Krishna Srivastava, Schaumburg, Ill.

[73] Assignee: GTE Sylvania Incorporated, Stamford, Conn.

[22] Filed: Jan. 27, 1975

[21] Appl. No.: 544,278

[52] U.S. Cl. ................................. 358/20; 358/34
[51] Int. Cl.² .................. H04N 9/46; H04N 9/535
[58] Field of Search ............ 358/19, 20, 21, 26, 27, 358/28, 33, 34, 39, 40; 178/7.3 R, 7.3 DC, 7.5 R, 7.5 DC, 69.5 CB; 328/36

[56] References Cited
UNITED STATES PATENTS

| | | | |
|---|---|---|---|
| 2,840,703 | 6/1968 | Dobson | 358/20 |
| 2,892,018 | 6/1959 | Baugh | 358/20 |
| 3,231,669 | 1/1966 | Ronzheimer | 178/7.3 DC |
| 3,305,637 | 2/1967 | Loughlin et al. | 178/7.5 DC |
| 3,358,155 | 12/1967 | Crosby | 178/7.3 DC |
| 3,541,235 | 5/1970 | Kreseck et al. | 358/20 |
| 3,544,708 | 12/1970 | Buechel | 358/20 |
| 3,549,801 | 12/1970 | Davies et al. | 178/7.3 DC |

Primary Examiner—Robert L. Griffin
Assistant Examiner—John C. Martin
Attorney, Agent, or Firm—Norman J. O'Malley; Thomas H. Buffton; Robert T. Orner

[57] ABSTRACT

In a signal receiver utilizing a video signal having a blanking signal with a backporch portion whereat a color burst signal is disposed includes a ramp potential development means responsive to a pulse signal as well as a potential storage, clamping, and slope altering means for effecting alterations in the width of a burst gate potential. In another aspect, a potential storage, clamping, and slope altering means is responsive to the ramp potential development means for effecting clamping of the backporch portion of the blanking signal.

14 Claims, 7 Drawing Figures

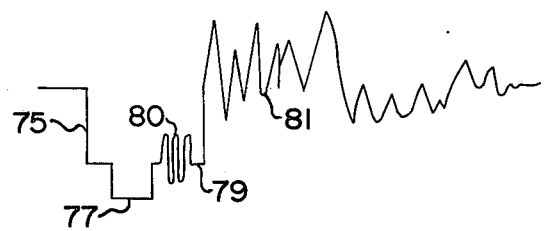
Fig. 3A
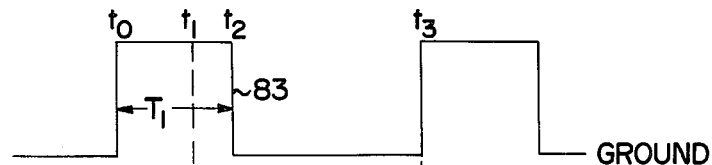
Fig. 3B
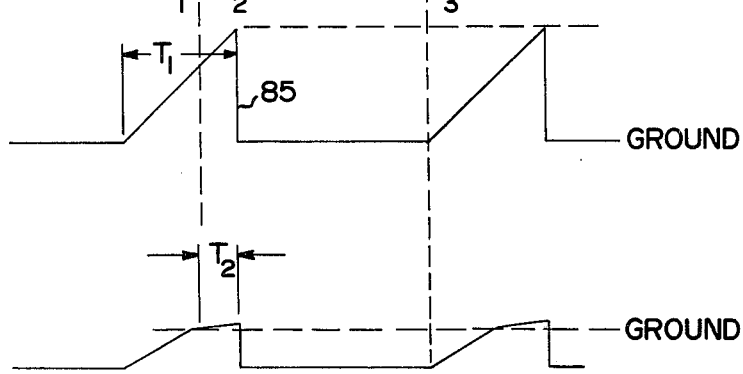
Fig. 3C
Fig. 3D
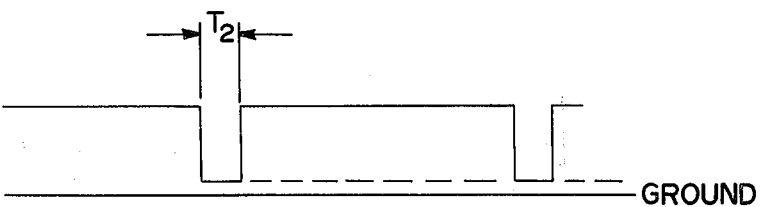
Fig. 3E

BURST GATE AND BACKPORCH CLAMPING CIRCUITRY

BACKGROUND OF THE INVENTION

This invention relates to circuitry for gating a color burst signal in one aspect and to clamping the backporch portion of a video signal in another aspect. In a more specific aspect, circuitry for controlling the color burst gating and backporch clamping is provided.

The prior art suggests a color burst signal gating technique wherein a pulse signal coincident in time with the blanking portion of a video signal is applied to a resistor-capacitor integrating network. Therein was derived a gating signal which was employed to trigger an oscillator on, for the APC and ACC detectors during the color burst signal.

Although the above-mentioned technique has been and still is employed in numerous available color television receivers, it has been found that the attainable result does leave something to be desired. For example, it has been found that the width of a pulse signal available from such an integrating network tends to vary in accordance with variations in the loading of the circuitry. Moreover, it has also been found that such circuitry tends toward a relatively slow discharge whereupon chroma signals related to scene immediately following a color burst tend to gate in along with the burst signal because the gate undesirably trails off rather than abruptly ends.

OBJECTS AND SUMMARY OF THE INVENTION

An object of the present invention is to enhance the control over color burst gating in a signal receiver. Another object of the invention is to provide improved control of backporch clamping in a signal receiver utilizing a video signal. Still another object of the invention is to provide narrow color burst gating circuitry wherein the effect of undesired noise signals is reduced. A further object of the invention is to enhance width control over color burst gating and backporch clamping circuitry.

These and other objects, advantages and capabilities are achieved in one aspect of the invention in a television receiver employing a video signal with blanking and backporch portions wherein a ramp potential is developed from a pulse signal and employed to control the width of a resultant color burst gating pulse.

BRIEF DESCRIPTION OF THE DRAWINGS

FIG. 3A–3E are illustrative waveforms helpful in explaining the operation of the embodiment of FIG. 2.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
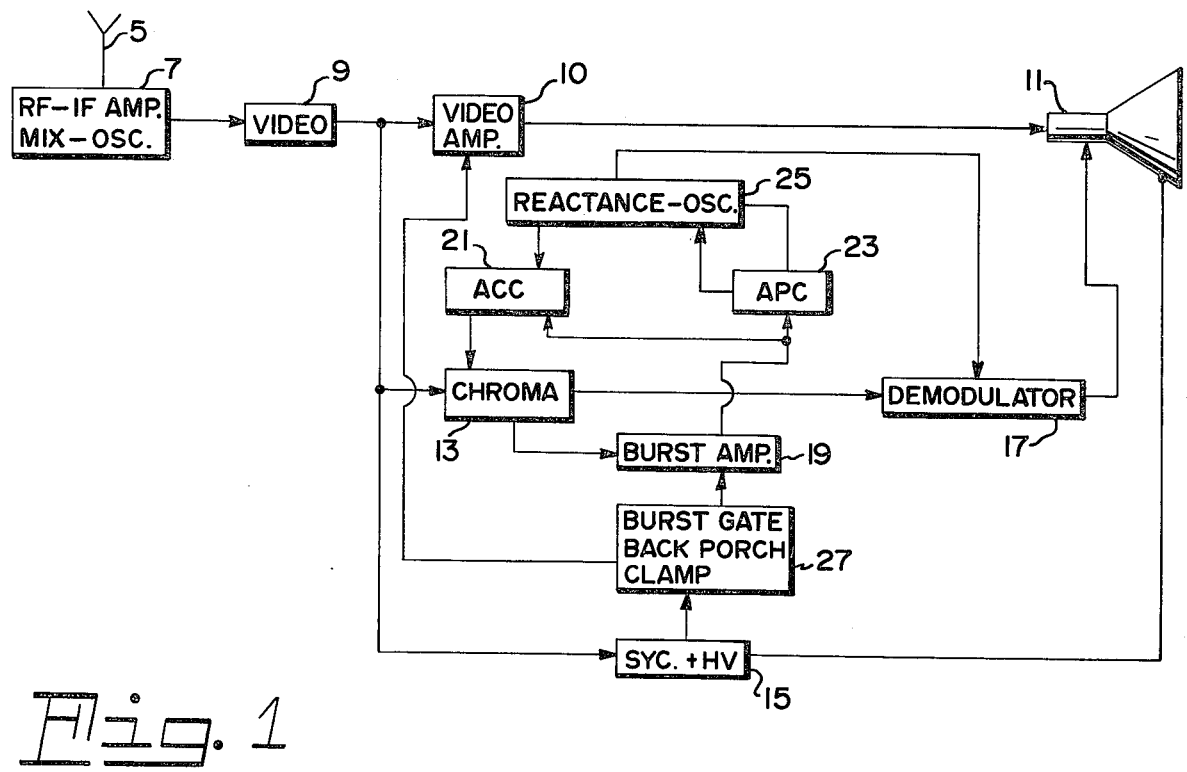
FIG. 1 is an illustration, in block form, of a color television receiver employing the invention.

In the drawings, FIG. 1 illustrates a color television receiver responsive to color television signals which include video and blanking information. The receiver includes the usual antenna 5 coupled to a signal receiver 7 wherein is included the RF and IF amplifier, mixer, and oscillator stages.

The signal receiver 7 is coupled to a video preamplifier stage 9 wherein is derived a signal which includes video as well as blanking and synchronizing information. Outputs from the video pre-amplifier stage 9 are applied to the video amplifier stage 10, a chroma stage 13, and a synchronizing and high voltage development stage 15. The output from the video amplifier stage 10 is applied to the cathode ray tube 11.

The chroma stage 13 provides an output signal representative of chrominance information which is applied to demodulator stages 17 and also to a color burst amplifier stage 19. The burst amplifier stage 19 is coupled to an automatic chroma control circuit 21 (ACC) and to an automatic phase control circuit 23 (APC). The automatic chroma control circuit 21 and the automatic phase control circuit 23 are both coupled to a reactance and oscillator stage 25. Moreover, an output signal from the ACC circuit 21 is coupled back to the chroma stage 13 while an output from the oscillator stage 25 is applied to the demodulator stages 17. In turn, the output of the demodulator stages 17 is applied to the cathode ray tube 11.

Also, the synchronizing and high voltage development stage 15 provides an output which is applied to the cathode ray tube 11 and a flyback pulse signal which is applied to burst gate and backporch clamping circuitry 27. Outputs from the burst gate and backporch clamping circuitry 27 are applied to the color burst amplifier stage 19 and to the video amplifier stage 10.

Figure 2:
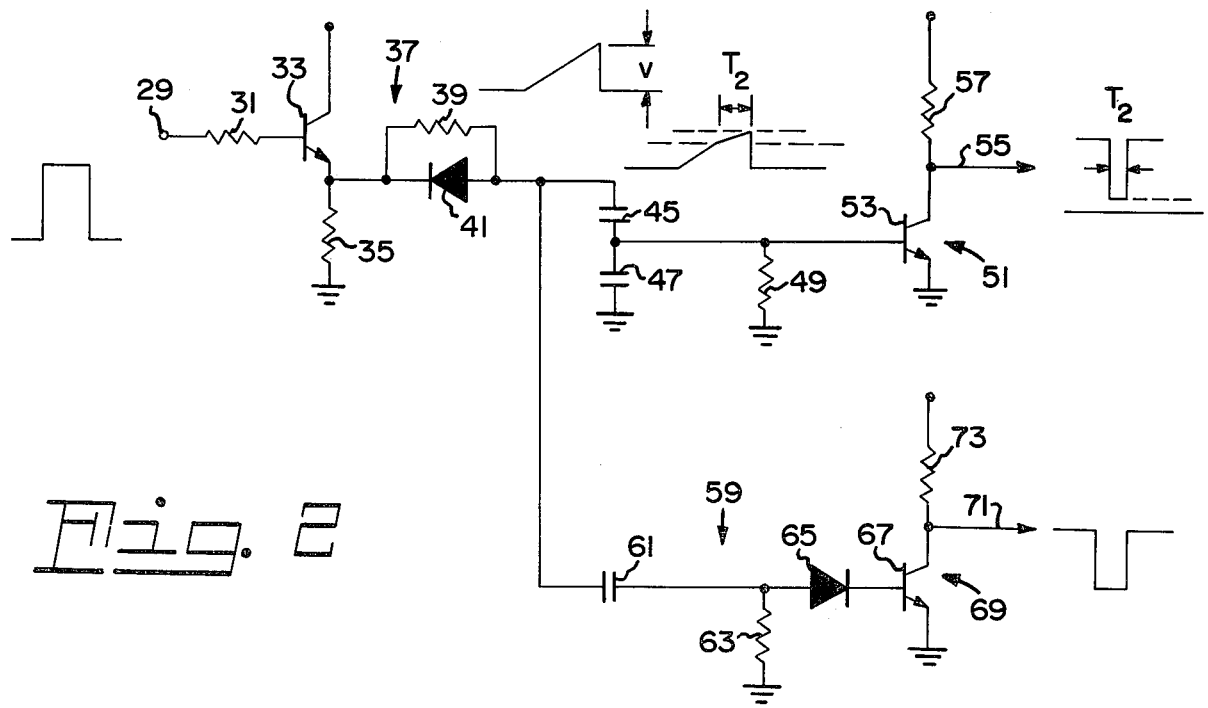
FIG. 2 is a schematic illustration of a preferred form of burst gate and backporch clamping circuitry.

As to the burst gate and backporch clamping circuitry 27, reference is made to the illustration of FIG. 2. Herein, a flyback pulse signal available at a terminal 29 is applied via a resistor 31 to the base of a transistor 33. The transistor 33 has a collector connected to a potential source B+ and an emitter coupled by way of a resistor 35 to circuit ground.

This resistor 35 is included in a ramp circuit 37 which also includes a parallel coupled resistor 39 and diode 41. The parallel coupled resistor 39 and diode 41 are, in turn, coupled to the junction of the emitter of the transistor 33 and the resistor 35.

Also, a pair of capacitors 45 and 47 is series connected to the parallel connected resistor 39 and diode 41 and to circuit ground. The junction of the series connected capacitors 45 and 47 is connected to an impedance, in the form of a resistor 49, which is connected to circuit ground and to a clamping circuit 51. The clamping circuit 51 is in the form of a transistor 53 with a grounded emitter, a base coupled to the capacitors 45 and 47 and impedance 49, and a collector connected to an output terminal 55 and via a resistor 57 to a potential source B+.

Also, a backporch clamping circuit 59 includes a charge storage means in the form of a capacitor 61 coupled to the parallel connected resistor 39 and diode 41. An impedance, in the form of a resistor 63, is coupled to the capacitor 61 and to circuit ground. The capacitor 61 and resistor 63 are coupled via a diode 65 to the base of a transistor 67 which serves as a clamping means 69. The emitter of the transistor 67 is connected to circuit ground and the collector is connected to an output terminal 71 and via a resistor 73 to a potential source B+.

As to operation, reference is made to the illustrative operational waveform of FIG. 3. FIG. 3A illustrates the usual video signal having a blanking signal 75 with a sync pulse signal portion 77, a backporch portion 79 and a color burst signal 80 associated with the backporch portion 79. Also, the video information 81 is disposed immediately adjacent the blanking signal 75.

In time coincidence with the blanking signal 75 of FIG. 3A is a flyback pulse signal 83 illustrated in FIG. 3B. This flyback pulse signal 83 has a width $T_1$ which is substantially equal to the width of the blanking signal 75 and an amplitude intermediate circuit ground and the potential source B+.

This flyback pulse signal 83 is applied to the ramp circuit 37 wherein a ramp signal 85 of FIG. 3C is provided. Herein, a relatively slow charge circuit includes the resistor 39. Moreover, the ramp signal 85 has a width substantially equal to the width of the flyback pulse signal 83 of FIG. 3B.

This ramp signal 85 is applied to the charge storage means or series connected capacitors 45 and 47 of the ramp circuit 37. The ramp circuit 37 includes a clamping means in the form of a transistor 53 whereby the peak of the ramp signal 85 is clamped and an impedance 49 whereby the slope of the ramp signal is altered as illustrated in FIG. 3D. Also, the altered portion of the slope of the ramp signal has a width $T_2$ which is directly related to the value of the impedance 49 as will be explained. Moreover, this width $T_2$ of the ramp signal is proportional to the conductivity of the clamping circuit or transistor 53 whereupon the width of the burst gate or output, FIG. 3E, is also of the width $T_2$.

Additionally, the ramp signal 85 of FIG. 3C may also be applied to a charge storage means in the form of a capacitor 61 of a backporch clamping circuit 59. As previously explained, the peak of the ramp signal 85 is clamped by the clamping means 69 and the slope of the ramp signal 85 is altered by the resistor 63 as illustrated in FIG. 3D.

The altered portion of the slope $T_2$ of FIG. 3D is determined by the conductivity of the transistor 67 and is directly related to the value of the resistor 63 as will be explained. In turn, the width of the backporch clamp signal, $T_2$ of FIG. 3E, available at the output 71 of the backporch clamping circuit 59 varies in accordance with the width of the altered slope, $T_2$ of FIG. 3D. Thus, the width of the backporch clamping as well as the width of the color burst gate signal is readily determined and readily alterable.

As to the altered slope portion, $T_2$ of FIG. 3D, which determines the width of the burst gate or backporch clamping waveform, reference is made to the clamping circuit set forth on pages 270-275 of a book by Millman and Taub entitled "Pulse, Digital, and Switching Waveforms" published by McGraw-Hill Book Company. Therein, the theorem is set forth that the ratio of the area of the pulse above ground to the area of the pulse below ground is equal to the ratio of the forward impedance of the base-emitter of the transistor 53 to the resistance of the impedance 49. In other words:

$$\frac{Af}{AR} = \frac{Rf2}{R49}$$

AF = Area of pulse signal above ground of FIG. 3D
AR = Area of pulse signal below ground FIG. 3D
Rf2 = Foward impedance of the base-emitter of transistor 53
R49 = impedance of a selected resistor.

Accordingly, it can readily be seen that the width of the resultant burst gate signal or of the backporch clamp signal may be readily determined by the selection of the value of the impedance which in this case is the ohmic value of the resistor 49 or the resistor 63.

In another aspect of the operation of the above-mentioned circuitry, consider the resistor 49 removed from the circuit or as an infinite impedance. A first ramp signal will charge the capacitor 45 to a value $v$ through the diode-acting base-emitter of transistor 53 (neglecting the base-emitter drop $V_{be}$ of the transistor 53). Since the capacitor 45 is charged through the transistor 53, the transistor 53 is conductive whenever the capacitor 45 is charging.

At the end of the ramp signal, the diode 41 will conduct and the voltage at the junction of the capacitor 45 and resistor 39 will reach ground potential (neglecting the forward voltage drop $V_{be}$ of the diode 41 and assuming that the resistor 35 is of a relatively small ohmic value). Moreover, the fact that diode-acting base-emitter of the transistor 53 is unable to conduct in a reverse direction renders discharge of the capacitor 45 impossible. Therefore, the base voltage $V_b$ of the transistor at the end of the ramp signal will be:

$$V_b = -V \frac{C45}{C45 + C47}$$

Where V is equal to the amplitude of the ramp signal at the cathode of the diode 41.

The selection of the values of the capacitors 45 and 47 is made such that the base voltage $V_b$ is less than the reverse breakdown voltage of the base-emitter junction of the transistor 53. Since the capacitor 45 is not discharging, the base voltage $V_b$ will remain constant until the next ramp signal appears whereupon the base voltage $V_b$ will follow the voltage at the cathode of the diode 41.

Since the capacitor is not discharging during the time interval intermediate the ending of one $t_2$ and beginning of another $t_3$ of the ramp signals 85 of FIG. 3C, no additional charge is required during the ramp period $T_1$. Thus, the capacitor 45 does not charge anymore and the transistor 53 does not conduct anymore. Therefore, a condition whereat the resistor 49 is equal to infinity results in a zero conduction time $T_2$ of the transistor 53.

However, assuming a finite value for the resistor 49, the base voltage $V_b$ of the transistor 53, during the time interval intermediate the ending of one $t_2$ and beginning of another $t_3$ of the ramp signal 85, rises toward circuit ground potential due to the discharge of the capacitors 45 and 47 through the finite resistor 49. Thus, the charge lost from the capacitors 45 and 47 during the interval intermediate the ramp signals, $t_2$-$t_3$, due to the resistor 49, is compensated for by a charging of the capacitors 45 and 47 during a portion $t_1$-$t_2$ of the ramp signal 85 of FIG. 3C.

Since the capacitors 45 and 47 charge through the diode-acting base-emitter of the transistor 53, it follows that the transistor 53 conducts for the charge interval $t_1$-$t_2$. Therefore, the duration of the burst gate or the conduction time of the transistor 53 is determined by the selected value of the resistor 49. Similarly, the duration of the backporch pulse 79 of FIG. 3A or the conduction time of the transistor 67 is determined by the selected value of the resistor 63.

Thus, there has been provided a unique color burst gate circuit as well as a unique backporch clamping circuit. The circuitry is simple and inexpensive of components while providing a maximum control of both burst gating and backporch clamping. Also, the unique control of the gating and clamping signals greatly enhances the noise rejection capabilities and also improves the rejection of undesired video information in the color burst gating portion of the signal.

While there has been shown and described what is at present considered the preferred embodiment of the invention, it will be obvious to those skilled in the art that various changes and modifications may be made therein without departing from the invention as defined by the appended claims.

What is claimed is:

1. In a color television signal receiver utilizing a video signal having blanking signals with a backporch portion and a color burst signal on the backporch portion, burst gate and backporch clamping circuitry comprising:
   means for providing pulse signals in time coincidence with said blanking signals;
   means coupled to said means for providing pulse signals for gating said color burst signals including a first impedance coupled to a potential reference level, series connected charge storage means and clamping means coupled to said means for providing pulse signals and said first impedance, a second impedance coupling said charge storage means and clamping means to a potential reference level, and a third impedance coupling said clamping means to a potential source for producing an output signal in response to current flow through said clamping means; and
   means coupled to said means for gating said color burst signals for clamping said backporch portion of said video signal including series connected charge storage means and clamping means with a fourth impedance coupling the junction of the charge storage and clamping means to a potential reference level and a fifth impedance coupling said clamping means to a potential source for producing an output signal in response to current flow through said clamping means.

2. The burst gate and backporch clamping circuitry of claim 1 wherein said means for gating said color burst signals includes a parallel connected impedance and unidirectional conduction device coupling said impedance coupled to a potential reference level and to said means for providing pulse signals and said series connected charge storage means and clamping means.

3. The burst gate and backporch clamping circuitry of claim 1 wherein said impedance coupled to said potential reference level and to said means for providing pulse signals, said impedance coupling said charge storage and clamping means to a potential reference level, and said impedance coupling said clamping means to a potential source are all in the form of resistors.

4. The burst gate and backporch clamping circuitry of claim 1 wherein said charge storage means of said means for gating said color burst signals includes at least one capacitor in series connection with said clamping means.

5. The burst gate and backporch clamping circuitry of claim 1 wherein said clamping means of said means for gating said color burst signals is in the form of a transistor having an input coupled to said charge storage means and an output coupled to an impedance connected to a potential source.

6. In a color television signal receiver utilizing a video signal having a blanking signal with a backporch portion and a color burst signal associated with the backporch portion, burst gate and backporch clamping circuitry comprising:
   a source of pulse signals in time concidence with said blanking signals;
   means coupled to said source of pulse signals for developing a ramp signal, said means including a series coupled impedance, charge storage means, and clamping means;
   means coupled to said means for developing a ramp signal and to a potential reference level for discharging said charge storage means intermediate said pulse signals from said pulse signal source;
   means coupled to said clamping means of said means for developing a ramp signal and to a potential source, said means responsive to current flow through said clamping means for producing an output signal for gating said color burst signal; and
   means coupled to said means for developing a ramp signal for clamping said backporch portion of said video signal, said means including a clamping means coupled by an impedance to a potential source and responsive to current flow therethrough to effect production of an output signal therefrom.

7. The burst gate and backporch clamping circuitry of claim 6 wherein said means for developing a ramp signal includes an impedance coupled to said source of pulse signals and to a potential reference level and an impedance, charge storage means, and clamping means series connected to said source of pulse signals.

8. The burst gate and backporch clamping circuitry of claim 6 wherein said means for developing a ramp signal includes a unidirectional conduction device shunting said impedance series coupled to said charge storage means.

9. The burst gate and backporch clamping circuit of claim 6 wherein said means for clamping said backporch portion of said video signal includes a series connected charge storage and clamping means coupled to said means for developing a ramp signal, an impedance coupling said charge storage means and said clamping means to a potential reference level, and an impedance coupling said clamping means to a potential source and responsive to current flow through said clamping means for providing an output signal.

10. The burst gate and backporch circuit of claim 6 wherein said means for clamping said backporch portion of said video signal includes a series connected charge storage means, unidirectional conduction device, and clamping means coupled to said means for developing a ramp signal.

11. Burst gate and backporch clamping circuitry for a color television receiver utilizing a video signal with blanking pulse signals having a backporch portion and color burst signals time coincident with the backporch portion comprising:
   means for providing pulse signals in time coincidence with said blanking signals;
   means coupled to said means for providing pulse signals for gating said color burst signals, said means including means for developing a ramp signal across a charge storage means, means for discharging said charge storage means intermediate said pulse signals, means for clamping said ramp signal, and means responsive to current flow through said means for clamping said ramp signal for producing an output signal to effect gating of said color burst signal; and means coupled to said means for gating said color burst signals for clamping said backporch portion of said blanking signal whereby color burst signals are gated and the backporch portion of a blanking signal is clamped.

12. The burst gate and backporch clamping circuitry of claim 11 wherein said means for gating said color burst signals includes an impedance coupled to a potential reference level and to said means for providing pulse signals, an impedance coupled to said source of pulse signals, a charge storage means coupled to said impedance coupled to said means for providing pulse signals, an impedance coupled to said charge storage means and to a potential reference level, a clamping means coupled to said charge storage means, and an impedance coupling said clamping means to a potential source.

13. The burst gate and backporch clamping circuitry of claim 11 wherein said means for clamping said ramp signal of said means for gating said color burst signals is in the form of a transistor coupled to said charge storage means and said means for discharging said charge storage means intermediate said pulse signals and to an impedance coupled to a potential source and responsive to current flow through said clamping means for developing an output signal for gating said color burst signal.

14. The burst gate and backporch clamping circuitry of claim 11 wherein said means for clamping said backporch portion of said blanking signal includes a charge storage means coupled to said means for gating said color burst signals, a clamping means coupled to said charge storage means, and an impedance coupling said clamping means to a potential source and responsive to current flow through said clamping means for effecting an output signal.

* * * * *

UNITED STATES PATENT OFFICE
CERTIFICATE OF CORRECTION

PATENT NO. : 3,949,418
DATED : April 6, 1976
INVENTOR(S) : Gopal K. Srivastava

It is certified that error appears in the above-identified patent and that said Letters Patent are hereby corrected as shown below:

Col. 3, line 64 - Please delete "AF" and insert -- Af --.

Col. 6, line 50 - Please delete "backporch circuit" and insert -- backporch clamping circuit --.

Signed and Sealed this

Sixth Day of July 1976

[SEAL]

Attest:

RUTH C. MASON
Attesting Officer

C. MARSHALL DANN
Commissioner of Patents and Trademarks